April 14, 1942.  N. T. KASZAB  2,279,825

STEREOSCOPIC PICTURE WITH APLANAT FOCUSING ELEMENT

Filed July 24, 1940

Nicholas T. Kaszab,
INVENTOR:
BY Julian J. Wittel,
his ATTORNEY.

Patented Apr. 14, 1942

2,279,825

UNITED STATES PATENT OFFICE 2,279,825

STEREOSCOPIC PICTURE WITH APLANAT FOCUSING ELEMENT

Nicholas T. Kaszab, New York, N. Y.

Application July 24, 1940, Serial No. 347,124

3 Claims. (Cl. 88—1)

This invention relates to stereoscopic pictures displaying successive aspects of the same object from laterally changed viewpoints.

As heretofore proposed, such pictures consisted of a transparent sheet having cylindrical focusing elements on one side and an opposite plane surface substantially in the focal fields of the focusing elements, and a stripe composite image in the said plane surface, the stripe elements of the image and the focusing elements of the screen being in a registering relation.

In such an arrangement the focusing elements have trough-shaped focal fields while the image is formed in a plane surface, and consequently the stereoscopic image will not appear well defined except from such directions which correspond with the intersections of the said plane and curved surfaces. On account of the curved focal fields and the aberration of the cylindrical lenses, such pictures are limited in size, may only display a very limited depth, and also the lateral viewing angle within which successively changing aspects may be displayed is limited.

The object of this invention is to provide novel screens for stereoscopic pictures, the focusing elements of which will focus in plane fields.

Another object of this invention is to provide aplanat screens for stereoscopic pictures (screens having plane focal fields), in which the aberration of the focusing elements is eliminated by the use of opaque stop lines.

Still another object of this invention is to provide stereoscopic pictures having an even definition and larger size, greater depth and wider viewing angle than is the case with the screens known heretofore.

This invention relates to the screen and the picture only while any of the known processes to make such pictures may be readily applied to my novel screens and pictures.

The basic idea underlying my invention is as follows:

I found that the simple assembly of a plano-convex lens of a relatively small aperture (either spherical or cylindrical), and a plane plate having a thickness of about 2.75 times the radius of curvature of the convex surface of the lens and placed in tangential relation to the said convex surface is an aplanat system. Light rays from a relatively great distance and incident on the plane outer surface of the lens will focus in the plane surface of the plate away from the lens.

Broadly stated, I apply this discovery in my screens and pictures. In its simplest embodiment an aplanat screen consists of a sheet cylindrically lenticulated on one side, another plane sheet in tangential relation to the cylindrical elements of the first sheet, the second sheet being of a thickness that its plane surface, away from the cylindrical lenses, will coincide with the plane focal fields of the said lenses in this assembly. For example: a standard photographic plate of 0.06" thickness and a lenticulated sheet, the radii of curvatures of its cylindrical elements of which are 0.022", the lenticulated side being in contact with the non-emulsion side of the photographic plate, will constitute the simplest form of an aplanat assembly. When such an assembly is substituted in lieu of the assembly heretofore proposed, an evenly defined stereoscopic picture will result.

The maximum viewing angle (that is the lateral space within which the spectator will receive successively changing aspects) depends on the spacing of the axes of curvatures of the cylindrical elements. With a simple screen just described, the spacing of the axes is obviously equal to the widths of the cylindrical elements which in turn should preferably not exceed the length of the radii of curvatures to avoid too much aberration.

As a consequence the viewing angle of a simple aplanat screen just described, may not be more than about 30°.

The viewing angle may be increased to about 40° by successively and increasingly tilting the cylindrical elements toward the lateral margins of the lenticulated sheet, as will be described hereinafter, this viewing angle being the practicable limit that may be attained with entirely transparent screens, having no opaque elements. To attain a still wider viewing angle I propose to combine a lenticulated screen with a lined screen in such a manner that opaque lines on the lined screen act as stops or diaphragms for the lens elements of the lenticulated screen. This can be done in a variety of manners, as will be explained presently with reference to the drawings.

In said drawing:

Fig. 1 represents the simplest embodiment of my aplanat stereoscopic picture assembly.

Figs. 2 to 8 represent variants of the same.

Some numerals have been used to denote similar parts or elements in the various figures.

Figure 1:
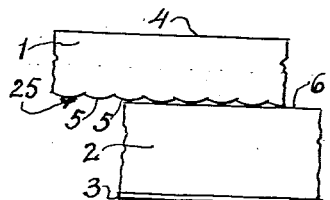
Figs. 1 to 8 represent end view diagrams of fractional parts of the different types of aplanat screens and pictures, greatly enlarged. For the sake of comparison, the radii of curvatures of the cylindrical elements in the various assemblies have been drawn to be equal.

Referring now to the drawing more in detail, in all the Figs. (1-8), there is shown a lenticulated sheet 1 having an outer plane surface 4 to function as the first refracting surface for incident rays, and an inner lenticulated surface 25 having convex cylindrical elements 5 and being the second refracting surface of the system. Contiguously placed to the said cylindrical elements 5 is a plane refracting plate 2, the plane surface 6 of which is tangential to the cylindrical elements 5 and will act as the third refracting surface 6, while the opposite plane surface 7 is the focal plane of the aplanat system or the image plane. A stripe composite image, which is indicated only by the line 7, may be either opaque or transparent, or it may be an image projected from the front or from the rear. Said image 7 may be carried on the plate 2 as a photographic emulsion 3 (Fig. 1) or directly reproduced by non-photographic methods on the image plane 7 of plate 2 (Fig. 2) or on a coating of aluminum paint 3 (Fig. 3) for images projected from the front, or on a frosted surface 7 (Fig. 6) when projected from the rear. The image 7 may also be carried on a separate sheet contiguous to the image plane 7 like a sheet of paper 3 (Fig. 4) or a glass plate 3 (Fig. 5) or a sheet of film 3 (Fig. 8) or an aluminum sheet 3 (Fig. 7). (When projected from the front.) Each of these methods of carrying the image is arbitrarily shown in conjunction with the respective screen, but I wish to be understood that they are interchangeable, except that opaque pictures should preferably be used with the transparent screens in Figs. 1 and 4.

In Fig 1, the cylindrical lenses 5 are shown as arcs of about 60°, this being the practicable limit of openings on account of the aberration which circumstance will limit the viewing angle of this type of aplanat screens to about 30°.

Figure 2:
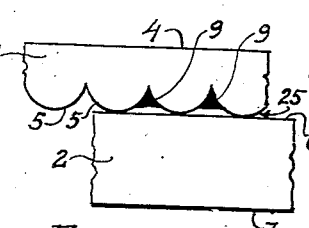

In Fig. 2, the lenses 5 are semi-cylinders and the deep parts between the lenses are being filled with a black pigment 9, so that only the center parts of the lenses 5 are left transparent. In this manner, the viewing angle is increased to about 60° and the aberration of the lenses 5 is reasonably limited.

Figure 3:
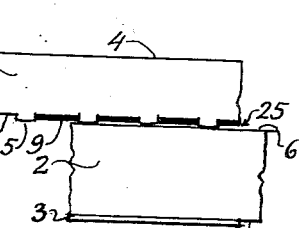

Fig. 3 shows a different mechanical embodiment of the optical principle of Fig. 2. The lenses 5 (Fig. 3) have relatively small openings, say 30°, and recessed grooves 8 are made between the lenses 5 and said grooves 8 are filled with an opaque pigment 9. The viewing angle of such a screen may be more than 60°.

Figure 4:
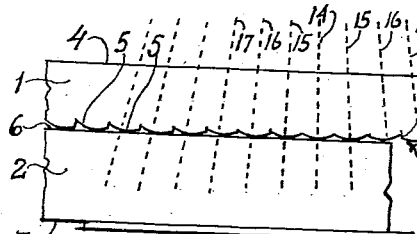

Fig. 4 shows a transparent screen, like the screen in Fig. 1, with certain improvements as to aberration, as will be explained hereinafter.

It is inherent in all stereoscopic pictures of this class that the cylindrical elements on the lateral margins receive light rays more obliquely than in the center of the screen or picture. This drawback is partly alleviated in the screens in Figs. 1, 2 and 3, since light rays incident on the first refracting surface 4 are deflected towards the normal line to the surface 4, and will meet the lenses 5 at about one-third less oblique angles than the angles of incidence. The screen in Fig. 4 is further improved in this respect. The lenses 5 are set at varying angles, their optical axes 15, 16, 17, etc., converging toward the optical axis 14 of the center lens 5 which is not tilted. Plane breaks or shoulders 10 are formed between the lenses 5. The lenticulated plate 1 (Fig. 4) is similar to the outer sheet 1 of my non-aplanat screen described in my Patent No. 2,150,225 for Screens for stereoscopic pictures, dated March 14, 1939. In such a screen (Fig. 4) the aberration at the margins is reduced to that at the center of the picture, resulting in a uniform definition of the picture. The breaks 10 are in fact faults in the optical system, and while this fault may be eliminated by making the breaks 10 opaque, I found that this is not necessary in actual practice, the light-scattering caused by these breaks being a negligible quantity.

Figure 5:
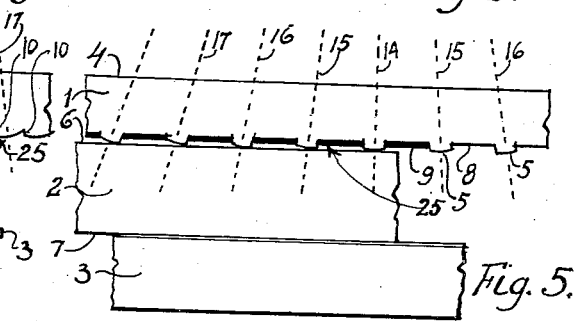

Fig. 5 shows a combination of the principles embodied in the screens in Figs. 3 and 4. The cylindrical lenses 5, Fig. 5, are spaced with recessed grooves 8 filled with opaque pigment 9, as in Fig. 3, but are also set at varied angles like in Fig. 4. Pictures made with such a screen (Fig. 5) will have wide viewing angle and uniform definition.

Figure 6:
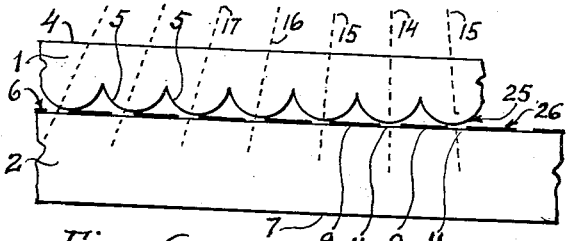
Figure 7:
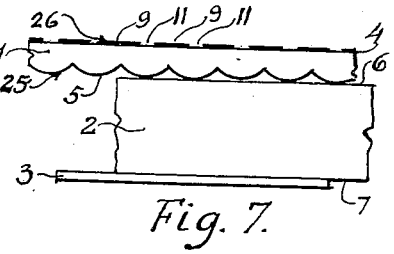

Fig. 6 represents another screen and picture assembly embodying the optical principles of the screen in Fig. 5 in a different mechanical manner. The cylindrical lens elements 5, Fig. 5, are of preferably wide opening and a lined screen 26 in parallelism to the cylindrical elements is carried on the plane 6 of the plate 2 contiguous to the lens element 5. The opaque lines 9' of said lined screen 26, act as stops in relation to the lenses 5 and the transparent lines 11 are preferably slightly farther spaced than the widths of the lens elements in such a manner that the optical axes 14, 15, 16 and 17, of the system converge in a pre-determined manner.

Fig. 7 represents another screen combination where a lined screen 26 is so placed, that the transparent lines 11 run symmetrically along the axes of curvatures of the cylindrical elements 5. The thickness of the lenticulated sheet 1 is equal to the radii of curvatures of the cylindrical elements 5, or in other words, the lined screen must be in the common diametrical plane of the cylindrical elements.

With such a combination, screen aberration and coma is completely eliminated. The sheet 1 in Fig. 7 may be made on a single sheet of photographic film first corrugated and then coated like the "Kodacolor" motion picture films and finally exposed to a pair of light sources laterally placed in pre-determined positions.

Figure 8:
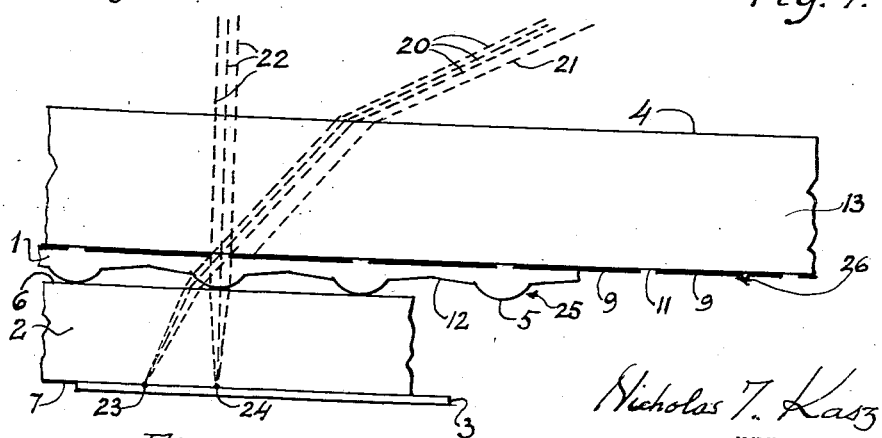

Fig. 8 represents a stereoscopic picture assembly embodying essentially the same optical principles as the assembly shown in Fig. 7, with the exception that the cylindrical focusing elements 5 are widely spaced and the opaque lines 9 are wider in relation to the transparent lines 11 than in the screen in Fig. 7. The assembly shown in Fig. 8 may be used for images having an extremely wide viewing angle. Fig. 8 also shows another mechanical embodiment of the lens and lined screen combinations.

A lined screen 26 will be made on a photographic plate 13, which in turn is coated with a plastic lacquer to form the sheet 1, and embossed in such a manner that the cylindrical elements 5 register with the transparent lines 11. Slantingly recessed parts 12 between the lenses have no optical function, but are preferred for reasons of manufacturing because a die made in this shape will easily dislocate the plastic material and to force it into the cylindrical grooves, in the process of the embossing. The thickness of the plastic coating must be determined with regard to the shape of the lenses 5 and the spacing 12 in such a manner that after the process of embossing, the plane or the lined screen 26 should coincide with the common diametrical plane of the cylindrical surfaces 5. The mechanical embodiments of the lens and lined screen combination, shown in Fig. 7 and in Fig. 8, respectively, obviously are interchangeable, that is, a single sheet of film may be used with the wide angle screen in Fig. 8, and vice versa.

A screen shown in Fig. 8 may have theoretically a 180° viewing angle, if the sum of the widths of one black line 9 plus one transparent line 11 is equal about 4.6 R, R being the radius of curvature of the lenses 5. A 180° changing panoramic view, however, is not desirable because objects protruding from the plane of the picture would be cut off by the frame of the picture.

Fig. 8 shows a screen having about 120° viewing angle which is practicable.

Fig. 8 also shows the optical scheme of aplanat focusing. Oblique light rays 20 will be deflected toward the normal at the first refracting surface 4 and will reach the cylindrical focusing surface 5 at an approximately radial direction, while rays 21 which would cause aberration are arrested by the black lines 9. The lenses 5 convergingly refract the said light rays 20, and the emerging wedge of ray is again deflected toward the normal at the third refracting surface 6 and will come to focus in the line 23 (represented by the point 23 in this end view diagram). Similarly, normal rays 22 will come to focus in the line 24. Both focal lines 23 and 24 will be located in the image plane 7.

The combinations of a lenticulated screen and a lined screen herein shown and explained may have a certain limited usefulness when used in a non-aplanat manner, that is, the lenses being away from the focal surface. Such assemblies are obvious and are not shown in the drawing. Such combinations may be useful to reduce aberration in non-aplanat screens of narrow viewing angle, but a wide viewing angle may not be attained in this manner since the said focal troughs would become increasingly deeper by the wider spacing of the focusing elements.

What I claim as new, is:

1. In a changing stereoscopic picture assembly, a sheet made of transparent material, a plurality of parallel convex cylindrical focusing elements on one side of said sheet, a plane sheet made of transparent material in contact with the focusing elements, the plane surface of the plane sheet away from the focusing elements being in the focal plane of said focusing elements, a stripe composite stereoscopic print or picture mounted in the said focal plane, said print or picture having one respective stripe element for each focusing element, the stripe elements and the focusing elements being in registering cooperative relation, the said stripe elements representing successive panoramic aspects of the same object as seen from laterally displaced view points at the respective focusing elements.

2. In a changing stereoscopic picture assembly, a sheet made of transparent material, a plurality of parallel convex cylindrical focusing elements on one side of said sheet, a lined stop system of transparent and opaque lines parallel to the cylindrical elements and adjoining said sheet, each transparent line in cooperative registering relation with a respective cylindrical focusing element, a plane sheet made of transparent material in contact with said focusing elements, a plane surface of said plane sheet away from the focusing elements being in the focal plane of said focusing elements, a strip composite stereoscopic print or picture mounted in the said focal plane, said print or picture having one respective stripe element for each focusing element, the stripe elements and the focusing elements being in registering cooperative relation, the said stripe elements representing successive panoramic aspects of the same object as seen from laterally displaced viewpoints at the respective focusing elements.

3. In a changing stereoscopic picture assembly, as set forth in claim 2, the thickness of the sheet having cylindrical elements being equal to the radius of curvatures of said cylindrical elements, the said lined stop system being located on the plane surface of the sheet having the cylindrical elements.

NICHOLAS T. KASZAB.